Figure 1:
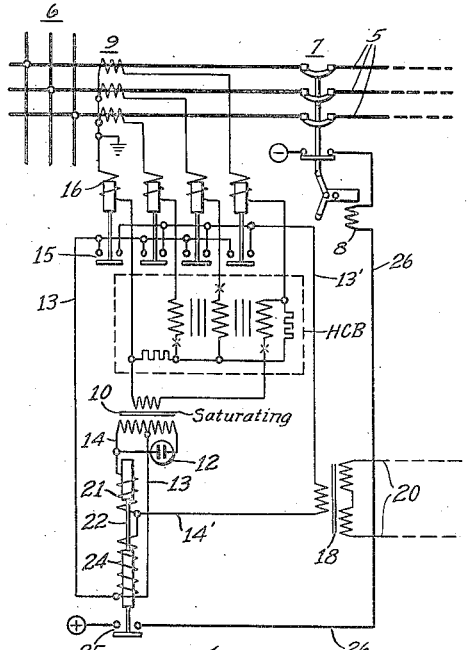

March 10, 1942. R. M. SMITH ET AL 2,276,068

DIFFERENTIAL PROTECTIVE RELAYING SYSTEM

Filed Oct. 16, 1940

WITNESSES:
C. J. Weller.

INVENTORS
Roy M. Smith and
Myron A. Bostwick.
BY
O. B. Buchanan
ATTORNEY

Patented Mar. 10, 1942

2,276,068

UNITED STATES PATENT OFFICE 2,276,068

DIFFERENTIAL PROTECTIVE RELAYING SYSTEM

Roy M. Smith, Livingston, and Myron A. Bostwick, Budd Lake, N. J., assignors to Westinghouse Electric & Manufacturing Company, East Pittsburgh, Pa., a corporation of Pennsylvania Application October 16, 1940, Serial No. 361,398

35 Claims. (Cl. 175—294)

Our invention relates to differential protective relaying systems in which the currents entering and leaving a protected apparatus are compared for the purpose of detecting internal faults within the apparatus, and our invention has particular relation to means, included in the protective equipment, for increasing the sensitivity of the differential protective apparatus under system-conditions in which a substantial amount of fault-current is fed into the protected apparatus from only one terminal thereof, in the event of an internal fault within the apparatus to be protected. More particularly, our invention relates to pilot-channel protective relaying systems, such as are utilized for the protection of a line-section of an alternating-current transmission line, wherein line-fault-responsive relaying-means are provided, which utilize a current obtained from some other point in the transmission line for assisting in protecting the line-section against internal faults while avoiding a line-segregating operation in the event of a transmission-line fault occurring beyond said other point. Still more specifically our invention relates to pilot-wire protective relaying systems.

In pilot-channel protective relaying-systems in which the direction of a relaying current suitably responsive to a line-current function at one end of the protected line-section is made available at the other end of the protected line-section for the purpose of comparison with the relative direction of a corresponding line-fault-responsive relaying-current at said other end of the protected line-section, it frequently happens that the calibration or sensitivity of the differential or directional fault-responsive relaying-means is different, for internal line-faults which are fed from both ends of the protected line-section, than for internal line-faults which are fed from only one end of the protected line-section. Specifically, where the line-fault-responsive relaying-means has an operating coil which is connected in shunt-circuit relation across a two-wire pilot-channel, and a restraining coil which is serially connected in said pilot-channel, that is, in a pilot-wire relaying system in which restraint-current is circulated over the pilot wires, the operational conditions effective upon the differential or directional pilot-wire relay are such that no current flows through the pilot-channel in the event of an internal line-fault which is fed with substantially equal fault-currents from both ends of the protected section. In other words, the pilot-channel is in effect substantially open-circuited under such doubly-fed internal-fault conditions. On the other hand, however, if an internal line-section fault is fed substantially from only one end of the protected line-section, the relaying current which is derived from the end at which fault-current is supplied divides, in the pilot-wires, so that the operating coil of the pilot-wire relay at that end may receive only approximately one-half of the relaying-current at its end, the other half of the relaying current being by-passed over the pilot-wires so that it flows through the operating coil of the pilot-wire relay at the other end of the protected line-section. Such protective systems operate, in response to a "through" fault-current (flowing through the protected line-section to a transmission-line fault located outside of said section), by causing a large portion of the relaying-current which is supplied at each end of the protected line-section to be circulated through the pilot-wires, with only a small portion of the relaying-current passing through the operating coil of either of the pilot-wire relays at the respective ends of the protected line-section, so that, in substantial effect, the pilot-wire channel is short-circuited under such through-fault conditions.

It is an object of our present invention to provide auxiliary means, responsive either to a low-fault-current condition at one end of the protected line-section, or to a predetermined difference in the magnitudes of the relaying-current derived from the respective ends of the protected line-section, to in effect open-circuit the pilot communicating channel under such conditions, or, in general, to perform some operation which serves to increase the sensitivity of the pilot-channel relays under conditions where current of fault-magnitude is fed into a faulted line-section from only one end thereof.

In certain aspects of our invention, where a carrier-current pilot-channel may be utilized for transmitting a relaying-current from one end of the section to the other, for directional-comparison purposes, our invention may be regarded as an improvement over a copending application of Myron A. Bostwick, Serial No. 350,653, filed August 3, 1940, for "Pilot-channel protective relaying systems." In said copending Bostwick application, an intermittent carrier-current pilot-channel system was utilized in which carrier currents were modulated so as to transmit impulses responsive to half-cycles of the line-current impulses at one end, so as to be received and detected at the other end, and utilized for the purpose of comparison with the relative direction of the corresponding line-currents at the receiving end, the same as if the received currents had been transmitted over a pilot-wire channel, and in said copending Bostwick application, means were shown for in effect open-circuiting the pilot-communicating channel, in response to less than a fault-magnitude of line-current at the transmitting end, by causing the carrier-current transmitter to be non-transmitting under these conditions.

It is an object of our invention, not only to apply the novel principles thereof to a pilot-channel protective-relaying system (whether utilizing carrier current or pilot wires as the pilot-channel), but also to provide means for at times promptly putting a two-wire pilot-channel in condition for tripping, in cases where fault-current is fed into only one end of a faulted line-section, as by open-circuiting a pilot-channel of a type which circulates "restraining" current. So far as we are aware, a two-wire pilot-channel has never before been open-circuited, or otherwise operated upon to make the relay-operating current overcome the relay-restraining current or force, by special auxiliary relaying-means provided for such a purpose.

With the foregoing and other objects in view, our invention consists in the combinations, systems, circuits, apparatus and methods hereinafter described and claimed and illustrated in the accompanying drawing wherein:

Figures 1 to 4 are diagrammatic views illustrating circuits and apparatus embodying our invention in four different exemplary forms of embodiment, each view indicating the terminal equipment at one end of a protected line-section, with the understanding that the terminal equipment at the other end may be a duplicate thereof.

In Fig. 1, we show our invention as applied to the protection of a line-section 5 of a 3-phase transmission line which is connected to a bus 6, or other apparatus, by means of a circuit breaker 7 having a trip-coil 8. We utilize line-current transformers 9 for responding to the 3-phase line-current at the illustrated station or line-terminal, and the phase and neutral currents supplied by said line current-transformers are supplied to a special phase-sequence network HCB, which derives a single-phase current which is supplied to the primary winding of a saturating transformer 10, the secondary winding of which is loaded with a neon lamp 12, or other voltage-limiting device. The secondary winding of the saturating transformer 10 is also tapped, so as to provide an output-circuit 13—14 having a relaying-voltage which is responsive to the phase-positions of the pulsations of the alternating-current function to which the HCB network responds, the maximum relaying-voltage of the output-circuit 13—14 being more or less limited, under fault-current conditions, by reason of the operative effect of the saturating transformer 10 and the neon lamp 12. The phase-sequence network HCB, the saturating transformer 10, and the neon lamp 12 may be any suitable means for providing a relaying-voltage having pulsations which respond to the phase of the line-current, and having a magnitude which may become more or less limited under fault-conditions. The particular means illustrated is a combined positive and zero-phase-sequence network which is described and claimed in a Harder Patent No. 2,183,646 and a Bostwick Patent No. 2,183,537, both granted December 19, 1939, and assigned to the Westinghouse Electric & Manufacturing Company.

In accordance with our invention, the conductor 13 of the output-circuit 13—14 is connected in series with four parallel-connected make-contacts 15 of four relays 16, the operating coils of which are connected in series with the respective phase and neutral leads of the line-current transformer 9. From the relay-contacts 15, the circuit 13 is continued, through a conductor 13', to the primary winding of an insulating transformer 18, the secondary winding of which is connected to a pair of pilot-wires 20 which run to the other terminal of the illustrated line-section 5.

The other conductor 14 of the output-circuit 13—14, as illustrated in Fig. 1, is serially connected to the restraint-winding 21 of a differential relay 22. From the restraint-winding 22, the circuit 14 continues, as conductor 14', to the other terminal of the primary winding of the insulating transformer 18.

The differential relay 22, in addition to having the restraint-winding 21, is provided with an operating winding 24 which is connected in shunt-circuit relation across the conductors 13 and 14'. The differential relay 22 is also provided with make-contacts 25 which are utilized to energize a trip-circuit 26 for energizing the trip-coil 8 of the circuit breaker 7 in order to effect a line-sectionalizing circuit-interrupting operation thereof.

It will be understood that Fig. 1 represents the terminal equipment at only one end of the protected line-section 5 and the pilot-wire channel 20, it being understood that the other end of the transmission-line section 5 is provided with terminal equipment which is a duplicate of that which is shown, so that the output-circuits 13'—14' at the two ends of the protected line-section 5 are connected together through the pilot-wires 20 and the respective insulating transformers 18 at the two ends of the pilot wires.

The polarities of the pilot-wire connection are such that, in the event of a "through" fault-current, which is accompanied by line-currents flowing through the protected line-section, from one end thereof to the other, and then flowing on beyond the protected line-section to an external fault somewhere else on the transmission system, practically all of the relaying-currents of the two output-circuits 13—14 at the two ends of the protected line-section are circulated through the pilot-wires 20, the substantial effect of this operation being that the pilot-wire circuit is short-circuited across the wires 13'—14' at each end of the said pilot-wire circuit. This circulating current, under external fault-conditions, is utilized to energize the restraining-windings 21 of the respective line-fault-responsive pilot-wire relays 22 at the respective ends of the protected line-section 5. At the same time, still assuming an external line-fault condition, the voltage-difference appearing across the operating coils 24 of the respective pilot-wire relays 22 at the two ends of the line-section is substantially zero, provided that the pilot-wire circuit is completed by the closure of one or more of the relay-contacts 16 at each end of the protected line-section.

In the event of an internal fault somewhere between the terminals of the protected line-section 5, and still assuming that the pilot-wire circuit is completed by the closure of at least one of the contacts 15 of the auxiliary relays 16 at each end of the protected line-section 5, the polarities are such that the relaying-voltages of the output-circuits 13—14 at the respective ends of the line-section oppose each other so that little or no current flows through the pilot wires 20, provided that the amount and phase of the fault-current which is fed into the faulted line-section from the respective ends thereof are substantially identical. Under these internal-fault circumstances, with substantially no current flowing over the pilot-wires 20, the pilot-wires are in effect substantially open-circuited, so that the full output-current of the relaying-circuit 13—14 of the line-terminal equipment shown in Fig. 1 flows through both the operating winding 24 and the restraint-winding 21 of the line-fault-responsive relay 22. In actual practice, the operating winding 24 has many times more turns than the restraint-winding 21, when the connections are as shown in Fig. 1, so that the pilot-wire relay 22 readily operates under these circumstances, that is, in response to an internal line-fault on the protected line-section 5. The operation of the fault-responsive relay 21 results in the closure of the relay-contact 25 which energizes the trip-circuit 26 and brings about an opening of the circuit break 7, so as to disconnect that end of the protected line-section 5 from other apparatus such as the bus 6.

As explained more fully in the Harder and Bostwick patents, previously mentioned, the limited-voltage nature of the relaying-voltage of the output-circuit 13—14 at each end of the protected line-section 5 causes the differential relay 22 to have a directional effect, whereby the relay responds, at least during current-carrying conditions of fault-magnitude, to the relative phases or directions of the line-currents at the respective ends of the protected line-section 5.

The novel feature which has been introduced in accordance with our present invention, as illustrated in Fig. 1, is the addition of the auxiliary fault-responsive overcurrent relays 16, which must be designed to be very fast in their operation. During normal power-transmitting conditions in the transmission line, therefore, the pilot-circuit is open-circuited at the auxiliary relay-contacts 15 between the conductors 13 and 13'. In the event that any one of the three line-currents in the three phases of the transmission line attains fault-current magnitude, or in the event that any material amount of ground-fault current flows in that overcurrent relay 16 which is connected in the neutral-circuit conductor of the current-transformers 9, the pilot circuit will be very quickly completed by the closure of the appropriate one of the relay-contacts 15.

In case the current of fault-magnitude results from an external fault-condition, it follows that any fault-current which enters the protected line-section 5 at one end must also leave it, at the other end, so that the appropriate overcurrent relay 16 will respond at each of the ends of the protected line-section, so that the pilot-wire channel will be completed, at both ends, in a time which is less than the time required for a response of the fault-responsive pilot-wire relay 22.

In like manner, for an internal fault in the protected-line-section 5, if current of fault-magnitude is supplied from the station-bus or other external apparatus at both ends of the protected line-section 5, the appropriate overcurrent relay 16 will pick up at both ends of the line-section, so that the pilot-wire channel will again be completed, but the completion of the pilot-wire channel will be immaterial, in this case, because of the opposition of the relaying voltages produced in the output-circuits 13—14 at the respective ends of the line-section, such voltage-opposition having substantially the same effect as an open-circuited pilot-channel, and causing a relay-operation of the fault-responsive relay 22, as previously described.

In the event of an internal fault on the protected line-section, under external transmission-system operating-conditions which are such that there is not an adequate source of fault-current at both ends of the protected line-section 5, our present invention comes into play to avoid a very objectionable operating condition. If it were not for our invention, which is represented, in Fig. 1, by the current-relays 16, the pilot-wire channel would be intact under these singly-fed fault-conditions, with the result that all of the relaying-current of the circuit 14 at the heavy-current end of the line-section would pass through the restraint-winding 21 of the fault-responsive relay at that end, but only about one-half of the current would pass through the operating winding 24 of said relay; the other half of the current being circulated over the pilot-wires 20 to the other end of the protected line-section, where low-current conditions prevail. It will thus be seen that the calibration of the protective relay 22 at the heavy-current end of the line-section has been substantially changed so that its sensitivity has been substantially halved by reason of the fact that practically no fault-current is fed into the line-section from the other end thereof.

In order to cause the relay 22 to respond, under such unfavorable conditions, it has heretofore been necessary to set the relay 22 so that it will respond to a phase-to-phase fault-current which is only one-half of the minimum expectable phase-to-phase fault-current on the protected line-section. Since the phase-sequence relay-response to a phase-to-phase fault-current is equal to one-half of that for a 3-phase fault-current, when the positive and negative-sequence impedances are equal (which is the usual case), it will be obvious that the relay-setting of the phase-sequence fault-responsive relay 22 would have to be adjusted to one-quarter of the minimum 3-phase fault-current, if the pilot-wire circuit were left intact during system-conditions in which fault-current is fed into the protected line-section from only one end thereof in connection with an internal fault. On many transmission systems, one-quarter of the minimum 3-phase fault-current may be lower than the maximum power-current which must be transmitted over the protected line-section under full-load conditions, so that it is not possible to utilize said one-quarter setting of the fault-responsive relays, because of the necessity for avoiding accidental tripping if the pilot-circuit should become opened.

Our present invention, therefore, is important in removing the quarter-setting drawback of previous phase-sequence pilot-wire protective-systems for 3-phase transmission lines. We avoid the necessity for utilizing the quarter setting, and we make it possible to utilize fault-responsive relays 22 having a setting equal to one-half of the minimum 3-phase fault-current, by utilizing our auxiliary overcurrent relays 16 of Fig. 1, or any equivalent means, some of which will be subsequently described, whereby the pilot-wire channel is artificially opened at that end of the protected line-section where current of fault-magnitude is not flowing in the line, thereby producing, in effect, substantially the same tripping effect (at the line-end where fault-current is being fed) as if equal and opposite fault-currents were flowing into both ends of the protected line-section at the same time.

Figure 2:
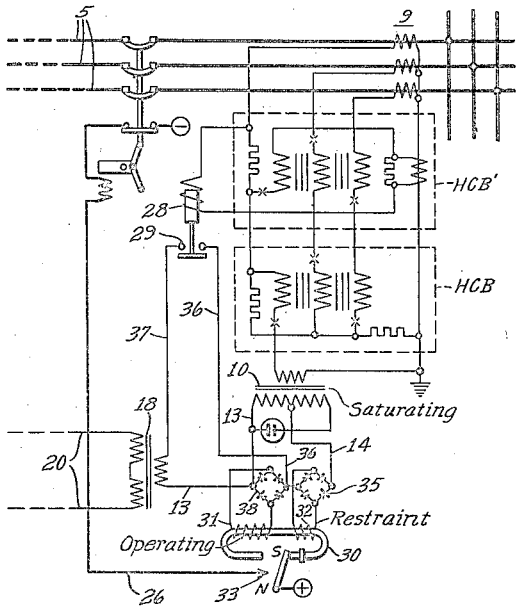

In Fig. 2, I show a protective system which is very similar to that which is illustrated in Fig. 1, except that the four auxiliary overcurrent relays 16 are now replaced by a single phase-sequence-responsive relay 28 having a make-contact 29 which is serially included in the pilot-wire channel between the two ends of the protected line-section. We also show, by way of illustration, a different form of pilot-wire relay 30, in place of the differential relay 22 which is shown in Fig. 1. In Fig. 2, the fault-responsive pilot-wire relay 30 is a polarized relay having an operating coil 31, a restraint-coil 32 and a make-contact 33, the latter being utilized to energize the tripping circuit 26. The restraint-winding 32 is illustrated as being energized in series with the output-conductor 14 of the saturating transformer 10, through a rectifier-bridge 35 which supplies unidirectional-current energy to the restraint-winding 32. From the rectifier-bridge 35, the circuit of the conductor 14 continues, through a conductor 36, to the make-contact 29 of the phase-sequence relay 28, after which the circuit continues, through a conductor 37, to the primary winding of the insulating transformer 18 of the pilot-wire circuit 20, the circuit being finally completed through the other circuit-conductor 13 of the output-circuit 13—14. The operating coil 31 is energized across the conductors 13 and 36, through a rectifier bridge 38.

In the form of our invention shown in Fig. 2, the phase-sequence relay 28 is energized through an auxiliary phase-sequence network HCB′ which operates similarly to the already-described phase-sequence network HCB so as to produce a single-phase voltage in response to a combination of the positive and zero phase-sequence components of the polyphase line-currents.

In the operation of the embodiment of our invention shown in Fig. 2, when any fault-current flows through either terminal of the protected line-section 5, that fact is detected by the auxiliary phase-sequence network HCB and the phase-sequence relay 28, which causes a prompt closure of the relay-contact 29 so as to complete the pilot-wire channel at that end of the protected line-section. The fault-responsive relay 30 operates similarly to the relay 22 in Fig. 1, except that the relay 30 is a polarized relay which imposes a lower volt-ampere burden on the current-transformers 9, as explained in the previously-mentioned Harder and Bostwick patents.

The two embodiments of our invention which are shown in Figs. 1 and 2 have the handicap that the pilot-wire relay 22 or 30 must be made slower than the auxiliary fault-detecting relays 16 or 28, in order to avoid faulty operation in the event of a "through" fault. This is because the pilot wires are normally open circuited, in Figs. 1 and 2, that is, the pilot-wire circuit is open-circuited at both ends of the protected line-section during normal fault-free power-flow conditions.

Figure 3:
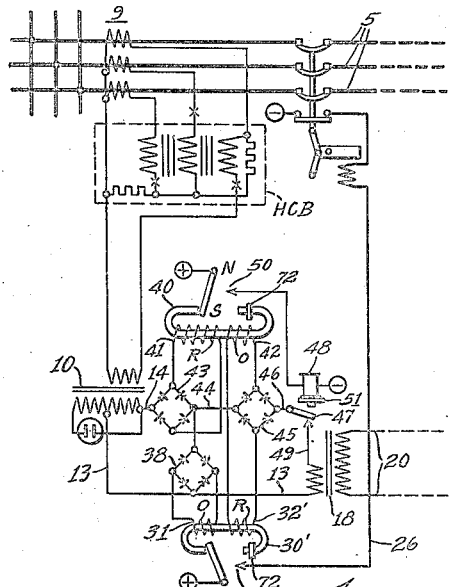
Figure 4:
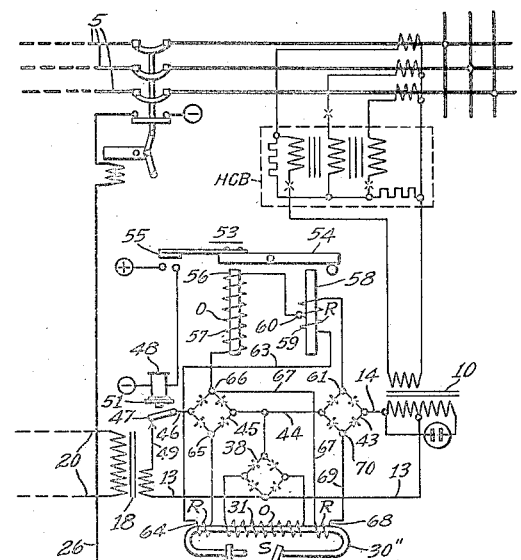

In the embodiments of our invention shown in Figs. 3 and 4, we overcome this handicap by utilizing a system in which the pilot-wires are normally intact, and are open-circuited only in the event of a predetermined difference in the magnitudes of the relaying currents or voltages at the respective ends of the protected line-section.

In Fig. 3, the auxiliary overcurrent relays 16 and 28 are omitted, and in lieu thereof we utilize an auxiliary differential relay 40 which is illustrated as being of the polarized type, the same being provided with a restraint-winding R, designated as 41, and an operating winding O, designated as 42. The restraint-winding R is energized responsively to the local relaying-current by being connected in series with the conductor 14 of the output-circuit 13—14 of the saturating transformer 10, the series connection being made through a rectifier-bridge 43 so that direct-current energy is supplied to the restraint-winding 41. The operating winding 42 of the auxiliary differential relay 40 is energized in series with the conductor 44, which extends on from the rectifier-bridge 43 as a continuation of the conductor 14, the series connection being again effected by means of a rectifier-bridge which is designated as 45.

The pilot-channel circuit continues, from the rectifier-bridge 45, through a conductor 46, to the back-contact 47 of a delayed-flux direct-current relay 48. From the back-contact 47, the pilot-channel circuit continues, through a conductor 49, to the primary winding of the insulating transformer 18, the secondary winding of which connects to the pilot wires 20. The other terminal of the insulating-transformer primary is connected to the second conductor 13 of the local output-circuit 13—14.

In Fig. 3 we illustrate the fault-detecting pilot-wire relay as a polarized relay 30′, similar to the polarized relay 30 of Fig. 2 except that the relative number of turns of the operating and restraining coils may be different, as will be subsequently described, and except, further, that the restraint-winding R, which is designated as 32′ in Fig. 3, is energized in series with the pilot-wire side of the connection 44 to the rectifier-bridge 38 which supplies the operating winding O, designated as 31. This connection of the restraint-winding 32′, in series with the pilot-wire current, instead of the more usual connection in series with the local relaying circuit, is shown by way of illustration. In order to make the restraint-winding 32′ of the fault-detector relay 30′ responsive to the pilot-wire current, it is shown as being energized from the rectifier-bridge 45, and in series with the operating winding 42 of the auxiliary differential relay 40. If the restraint-winding 32′ of the fault-detector relay 30′ had been energized, as in Fig. 2, so as to be responsive to the local relaying current, it could have been energized from the rectifier-bridge 43 and in series with the restraint-winding 41 of the auxiliary differential relay 40. It is obvious, also, that two separate rectifier-bridges could have been utilized for energizing the two windings 42 and 32′, instead of a single bridge 45, as illustrated.

The auxiliary differential polarized relay 40 of Fig. 3 is shown as being provided with a make-contact 50 which is utilized to energize the operating coil of the auxiliary direct-current relay 48 from the local battery-terminals which are indicated at (+) and (—). The auxiliary direct-current relay 48 is provided with a suitable flux-delaying means such as a conducting ring or washer 51 for the purpose of introducing a certain time-delay in the dropping out of the relay after a discontinuation of its energization. The pick-up time of the relay 48 is not greatly delayed by the washer 51, because sufficient direct-current energy is supplied to the relay to cause a substantially instantaneous pick-up of its switching-armature 47 as soon as the relay is energized. When the electrical energizing-circuit to the relay 48 is broken, however, the washer 51 operates as a short-circuited ring to retard the dying out of the magnetic flux so that the armature 47 is held up for a certain time, thereafter, for a purpose which will now be described, in connection with the operation of the system shown in Fig. 3.

In the normal operation of the circuit which is shown in Fig. 3, that is, during fault-free operation of the transmission line 5, the pilot-wire channel is intact by reason of the closure of the back-contact 47 of the auxiliary direct-current relay 48. In the normal operation of the transmission line, the power-current enters the line-section 5 at one end thereof, and the same current leaves it at the other end thereof. Corresponding relaying-currents are, therefore, circulated over the pilot-wires 20, and through both of the rectifier-bridges 43 and 45 at both ends of the line-section, only one terminal-equipment being illustrated in Fig. 3, the same as in all of the other figures, the other-end equipment being understood to be a duplicate of the illustrated end. As previously explained, very little of this circulating pilot-wire current passes through the shunt-connected rectifier-bridge 38 which supplies the operating winding 31 of the fault-detecting pilot-wire relay 30'. The auxiliary differential relay 40 is provided with more turns in its restraint-winding 41 than in its operating-winding 42, so that said auxiliary differential relay does not respond, when equal currents are passed through its restraint and operating-windings 41 and 42, under the fault-free circumstances just described.

So far as the auxiliary differential relay 40 is concerned, the same non-operation condition continues, even under fault-conditions, provided that substantially equal fault-currents appear at the two ends of the protected line-section 5, regardless of whether the fault is internal or external, because the rectifier-bridge 45 causes the operating winding 42 to be energized in the same current-flow direction, regardless of the phase or direction of the circulated alternating current which is circulated through the pilot-wire channel.

In the event of an internal fault on the protected line-section 5, however, if the fault-currents which are fed in, from both ends of the line-section, are exactly equal, and in phase with each other, there will be no circulated pilot-wire current, as has been previously explained, and hence there will be no energization of the operating coil 42 of the auxiliary differential relay 40.

In the event of an internal fault which is fed from only one end of the protected line-section 5, the response or non-response of the auxiliary differential relay 40 depends upon which end supplies the fault-current. If the local end of the line-section 5 supplies the fault-current, no fault-current being supplied from the other end of the protected line-section 5, then the restraint-winding 41 of the auxiliary differential relay 40 is energized responsively to the full value of the local relaying-current in the conductor 14. After passing through the rectifier-bridge 43, however, this local relaying-current divides, approximately one-half of it passing through the shunt-connected rectifier 38 which supplies the operating winding 31 of the local fault-detector relay 30', and the remainder of the current passing out, over the pilot-wire 20, to the corresponding shunt-connected rectifier-bridge 38 and pilot-relay operating coil 31 at the other end of the protected line-section. Under such circumstances, the operating coil 42 of the local or illustrated auxiliary differential relay 40 will receive only approximately half as much current as the restraint-winding 41 of the same relay, so that the relay still remains in its inoperative or non-responsive condition, as illustrated.

The aforesaid auxiliary differential relay 40 responds, in Fig. 3, only in the event of the occurrence of an internal fault which is fed from the far end of the protected line-section 5. In this case, substantially no energy is supplied by the local saturating transformer 10 which derives its current from the local line-current transformers 9. The relaying energy is supplied by the pilot wires 20, which carry approximately half of the total relaying current which is derived at the far end of the protected-line-section. This pilot-wire relaying-current passes full-strength through the rectifier-bridge 45 which energizes the operating winding 42 of the auxiliary differential relay 40, but before said current reaches the rectifier-bridge 43 of the restraint-winding 41, it divides, the major portion of it taking the path through the shunt-connected rectifier-bridge 38 which supplies the operating-winding 31 of the fault-detecting relay 30', while a relatively small portion of the relaying-current takes the path through the rectifying-bridge 43 of the restraint-winding 41, and thence through the saturating transformer 10 which is connected to the impedances of the phase-sequence network HCB.

The relative impedances of these two circuit-paths for the relaying currents are such that the restraint-coil 41 of the auxiliary differential relay 40 receives only about something like one-third as much current as the operating coil 42, under these circumstances, that is, when fault-current is supplied to an internal fault on the protected line-section 5 from only the far end of the line-section, and not at all from the local end where the relaying equipment under consideration is located.

With the above-described distribution of currents, it is obviously feasible to build the auxiliary differential relay 40 with twice as many turns in the restraint-winding 41 as in the operating winding 42, so that the relay will remain in its restrained or non-actuated position, with a wide margin of safety, under all line-conditions except where an internal line-fault is fed from the far end, in which case the ampere-turns in the operating coil 42 will be greater than the ampere-turns in the restraint-coil 41, in the ratio of 3 to 2, thus again providing a comfortable margin of safety, causing the auxiliary differential relay 40 to respond, so as to close its make-contact 50, thus energizing the auxiliary direct-current relay 48, and instantly opening the back-contact 47 of the said last-mentioned relay.

The effect of the above-described response of the auxiliary differential relay 40 is to interrupt the continuity of the pilot-wire channel at the relaying-contact 47 at the illustrated end of the transmission-line section 5, which is assumed to be the end at which current is not fed into an internal line-fault. The most important effect of this opening of the pilot-wire channel is obtained at the remote end of the protected line-section, that is, at the end at which the fault-current is being supplied to the internal fault in the line-section 5. Previous to the relaying-response which resulted in the opening of the pilot-wire channel at the relay-contact 41 at the illustrated end of the line-section, the fault-detecting pilot-wire relay (corresponding to 30') at the other or far end of the line-section had been energized with approximately half-current energization of its operating winding 31, and half-current energization of its restraint-winding 32'. After the opening of the pilot-channel, however, the aforesaid fault-responsive pilot-wire relay 30' at the far or non-illustrated end of the line-section receives full-current energization of its operating coil 31 and no energization, at all, of its restraint-winding 32'. This enormously increases the sensitivity of the aforesaid far-end fault-responsive relay 30', causing the latter to operate.

Whether the local fault-responsive pilot-wire relay 30' operates, or not, at the local or illustrated end of the line-section in Fig. 3, still assuming an internal line-fault which is fed only from the far end, is more or less immaterial because current of fault-magnitude is not being supplied to the faulted line-section at this end. Whether the aforesaid local fault-detecting pilot-wire relay 30' responds, under the described conditions, depends upon the relative numbers of turns of the operating and restraint-windings 31 and 32', and the relative speeds of operation of the aforesaid fault-responsive relay 30' as compared to the times of operation of the auxiliary differential relay 40 and the auxiliary direct-current relay 48.

In general, it will usually be expedient to utilize different relative numbers of turns on the operating and restraint-windings 31 and 32' of the fault-responsive pilot-wire relay 30', in Fig. 3, than in the corresponding relays 22 and 30 in Figs. 1 and 2, because of the fact that the restraint-winding 32' in Fig. 3 is energized responsively to the pilot-wire current, instead of responding to the locally supplied relaying-current. In Fig. 3, we have illustrated the fault-responsive pilot-wire relay 30' as having the same number of turns in the operating and restraint-windings 31 and 32' respectively, although we wish it to be understood that we are not limited to any specific relative numbers of turns, as this detail is subject to variation in accordance with the operating conditions of the transmission system and the desired sensitivity of response of the fault-responsive relay 30'.

In Fig. 4, by way of illustration of another of the numerous variations and adaptations of our invention, we have replaced the polarized auxiliary differential relay 40 of Fig. 3 with an ordinary non-polarized, or non-directional, instantaneous ratio-differential relay 53 which is illustrated as being of a type having a balanced beam 54 carrying a movable contact-member 55 at one end, and operated upon, at the front or contact-end, by an operating magnet 56 carrying an operating winding 57, also designated by the letter O. The rear end of the balanced beam 54 is operated upon by a restraining magnet 58 which carries a restraint-winding R or 59 which is provided with an intermediate or mid-tap 60.

The two halves or portions of the restraint-winding 59 are energized, in series with each other, across the serially connected direct-current terminals of the two rectifier-bridges 43 and 45 which carry the alternating currents which are to be compared in magnitude. This energizing-circuit may be traced from the direct-current terminal 61 of the rectifier-bridge 43 to the top terminal of the restraint-winding 59, and thence, by a conductor 63, from the bottom terminal of the restraint-winding 59 to a first restraint-winding 64 of the fault-detecting pilot-wire relay 30'', thence to the first direct-current terminal 65 of the other rectifier-bridge 45. The second direct-current terminal 66 of the last-mentioned rectifier-bridge 45 is connected, through a conductor 67, to a second restraint-winding 68 of the fault-detecting pilot-wire relay 30'', and finally, through a conductor 69, to the second direct-current terminal 70 of the first-mentioned rectifier-bridge 43.

The operating-winding 57 of the ratio-differential relay 53 is shunt-connected across an intermediate portion of the above-described restraint-winding circuit, the upper terminal of the operating-winding 57 being connected to the intermediate or mid-tap 60 of the restraint-winding 59, while the bottom terminal of the operating coil 57 is connected to the direct-current terminal 66 of the rectifier-bridge 45.

The result of the foregoing connections for energizing the ratio-differential relay 53 is that, when equal alternating currents are passed through the alternating-current terminal-conductors 14 and 46 of the two rectifier-bridges 43 and 45, respectively, there will be a zero potential-difference across the terminals of the operating-winding 57, only the restraint-winding 59 being energized, so that the ratio-differential-relay 53 remains in its illustrated non-responsive position.

When either one of the alternating-currents in the conductors 14 and 46 becomes larger than the other, no matter which one is the larger, the current flowing in one half or portion of the restraint-winding 59 will be larger than the current flowing in the other half or portion thereof, so that there will be a potential-difference between the terminal-points 60 and 66 of the operating-winding 57. The difference between the two direct currents which are supplied by the two rectifier-bridges 43 and 45 now passes through the operating winding 57 of the ratio-differential relay 53. The relay may be designed with many more turns on the operating winding 57 than on the restraint-winding 59, so that the relay will be adjusted to operate, with any desired degree of sensitivity, in response to any desired difference between the currents in the two rectifier bridges 43 and 45, or in response to any desired ratio of the difference of said currents to the sum of said currents.

When the ratio-differential relay 53 responds, in the embodiment of our invention shown in Fig. 4, it instantly closes its make-contact 55, energizing the auxiliary direct-current relay 48 in a manner which has already been described in connection with Fig. 3. It will be noted that the operation of the auxiliary differential relay 53 in Fig. 4 differs from the operation of the corresponding relay 40 in Fig. 3 in being responsive whenever there is a predetermined difference between the magnitude of the local relaying-current in the conductor 14 and the pilot-wire current in the conductor 46, no matter which is the larger, whereas, in Fig. 3, the auxiliary differential relay 40 responded only when the pilot-wire current was the larger.

In Fig. 4, therefore, the auxiliary differential relay 53 will respond whenever there is an internal fault in the protected line-section 5, regardless of how the fault-current is supplied to said fault, that is, regardless of whether the fault-current is supplied from the near end, the far end, or both ends. Thus, if the fault-current is supplied only from the near end, the local relaying current in the conductor 14 will be larger than the pilot-wire in the conductor 46, and the auxiliary differential relay 43 will respond: if the fault-current is supplied only from the far end, the pilot-wire current in the conductor 46 will be the larger, and the auxiliary relay 53 will again respond: and if the fault-current be supplied to an internal line-fault, in equal amounts from both ends of the protected line-section, the circulated pilot-wire current in the conductor 46 will be zero, whereas relaying-current corresponding to fault-magnitude conditions will be flowing in the local relaying-circuit 14, so that the auxiliary differential relay 53 will again respond.

The response of the auxiliary differential relay 53 to any internal fault on the protected line-section, however it may be fed, from one or both ends of the line-section, thus results in a prompt interruption of the pilot-wire channel, which has the effect, as previously described, of increasing the local-response sensitivity of the fault-responsive pilot-wire relay 30'' at each or either end where fault-current is supplied. This response of the auxiliary differential relay 53 also has the effect of relieving the fault-responsive pilot-wire relay 30'' of the restraint which is obtained by a comparison of the local relaying-current with a relaying-current received from the remote end of the protected line-section. In other words, the opening of the pilot-channel destroys the ability of the local relay to discriminate between faults inside and outside of the protected line-section, but since said opening of the pilot-channel is brought about only when there is an internal fault within the protected line-section, it thus follows that the discriminating pilot-channel function is destroyed (by the opening of the pilot channel) only at times when there is an internal fault, and hence when no discriminating restraint is needed in order to prevent a faulty relay-operation in response to an external fault outside of the protected line-section.

In the event of a "through" current entering one end of the protected line-section and passing straight on through the line-section and out of the other end thereof, there will be no response of our auxiliary differential relay 53 in Fig. 4, regardless of whether that "through" current is the result of normal power-flow or of fault-current flowing to an external fault somewhere on the transmission system outside of the protected line-section 5.

In Fig. 4, we have illustrated, by way of example, a fault-responsive pilot-wire relay 30'' having a single operating winding 31 and two restraint-windings 64 and 68, one of said restraint-windings, as 64, being energized responsively to the pilot-wire current, while the other one, 68, is energized responsively to the local relaying-current. It should be understood, however, that we are not limited to these particular connections or energizations of the fault-responsive pilot-wire relay 30'' in Fig. 4.

In Figs. 2, 3 and 4, whenever we have shown polarized relays, as at 30, 30', 40 and 30'', we have indicated such relays by conventional symbols, without any effort to illustrate the actual or preferred structural details thereof, as it is contemplated that any desired type of polarized relay may be utilized. We also indicate the polarized relay, in each case as being provided with some sort of short-circuited winding 72, which is usually needed for the purpose of controlling the speed of response of the relay and making the relay slow enough to avoid responding to very brief impulses or shock-excitations. A response of the order of from one-half cycle to a cycle and a half of the line-frequency current is ordinarily acceptable.

While we have described our invention in connection with four different forms of embodiment thereof, and while we have described the principles of operation of these embodiments of our invention, we wish it to be understood that our illustrations and descriptions are not intended in a restricted sense, as we are aware that many modifications and changes may be made by those skilled in the art without departing from the essential principles of our invention, particularly in its broader aspects. We call special attention to the facts that the pilot-wire channel is intended to be understood as being representative or symbolic of any means for making available, at the relaying end of the protected line-section (corresponding to the end which is illustrated, in each case), a relaying current or voltage, preferably of limited current-magnitude, which is responsive, in its pulsations or alterations, to the phase of a predetermined line-current function at the other end of the protected line-section. We desire, therefore, that our appended claims be given the broadest interpretation consistent with their language.

We claim as our invention:

1. The combination, with an alternating-current electrical apparatus to be protected, said apparatus having a first terminal where current normally enters the apparatus and a second terminal where current normally leaves the apparatus, under predetermined power-flow conditions, of means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, a fault-responsive relaying-means so associated with said two-wire conductive circuit as to be responsive both to the magnitudes and to the relative directions of the two relaying-voltages, and current-responsive control-means responsive, in some manner, to the amount of current flowing in at least one of said terminals of the protected apparatus for changing the response-conditions of said fault-responsive relaying-means in such manner as to vary the relative strength of the directional part of its operational control.

2. The combination, with an alternating-current electrical apparatus to be protected, said apparatus having a first terminal where current normally enters the apparatus and a second terminal where current normally leaves the apparatus, under predetermined power-flow conditions, of means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, a fault-responsive relaying means operatively associated with said two-wire conductive circuit, switching-means operatively associated with said two-wire conductive circuit for controlling the sensitivity of the response of said fault-responsive relaying-means to fault-currents flowing in only one of said terminals, the non-actuated condition of said switching-means being such as to simulate, in said fault-responsive relaying-means, a responsiveness to the current flowing in only one terminal but approximating a response to an internal-fault condition in which approximately equal and in-phase currents are fed into both terminals of the protected apparatus, and quick-acting current-responsive means, responsive to the attainment of a predetermined magnitude of current in one of said terminals, for actuating said switching-means.

3. The combination, with an alternating-current electrical apparatus to be protected, said apparatus having a first terminal where current normally enters the apparatus and a second terminal where current normally leaves the apparatus, under predetermined power-flow conditions, of means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, a fault-responsive relaying-means operatively associated with said two-wire conductive circuit, switching-means operatively associated with said two-wire conductive circuit for controlling the sensitivity of the response of said fault-responsive relaying-means to fault-currents flowing in only one of said terminals, and means responsive, in some manner, to a predetermined difference in the magnitudes of said first and second relaying-voltages for effecting a predetermined control over said switching-means.

4. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, the polarities and magnitudes of said first and second relaying-voltages being such that said two wires are in effect substantially short-circuited in the event of a "through" fault-current passing through the protected apparatus to an external fault, the operating-coil of said fault-responsive relaying-means being connected across said two wires, switching-means connected in series with said two-wire conductive circuit, and means responsive, in some manner, to the amount of current flowing in said second terminal of the protected apparatus for effecting a predetermined control over said switching-means.

5. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, the polarities and magnitudes of said first and second relaying-voltages being such that said two wires are in effect substantially short-circuited in the event of a "through" fault-current passing through the protected apparatus to an external fault, the operating-coil of said fault-responsive relaying-means being connected across said two wires, switching-means connected in series with said two-wire conductive circuit, and means responsive to the magnitude of the current in the second terminal of the protected apparatus for in effect causing said switching-means to be open at times when said second-terminal current is below a predetermined value and for in effect causing said switching-means to be closed at times when said second-terminal current is above a predetermined value.

6. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, the polarities and magnitudes of said first and second relaying-voltages being such that said two wires are in effect substantially short-circuited in the event of a "through" fault-current passing through the protected apparatus to an external fault, the operating-coil of said fault-responsive relaying-means being connected across said two wires, switching-means connected in series with said two-wire conductive circuit, and means responsive, in some manner, to a predetermined difference in the magnitudes of said first and second relaying-voltages for effecting a predetermined control over said switching-means.

7. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, the polarities and magnitudes of said first and second relaying-voltages being such that said two wires are in effect substantially short-circuited in the event of a "through" fault-current passing through the protected apparatus to an external fault, the operating-coil of said fault-responsive relaying-means being connected across said two wires, switching-means operatively associated with said two-wire conductive circuit between said operating-coil and some part of said second relaying-voltage means, said switching-means being effective, in its non-actuated position, to complete a control-circuit connection between said second relaying-voltage means and said operating-coil, said switching-means being actuable to in effect break said control-circuit connection, and means responsive, in some manner, to a predetermined difference in the magnitudes of said first and second relaying-voltages for actuating said switching-means.

8. The invention as defined in claim 7, characterized by said switching-means including means operative at least at times to prevent an immediate return to the non-actuated position of said switching-means after a cessation of said predetermined difference in magnitude to which said switching-means has responded.

9. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a two-wire conductive circuit joining the corresponding output-terminals of said first and second relaying-voltage means, the polarities and magnitudes of said first and second relaying-voltages being such that said two wires are in effect substantially short-circuited in the event of a "through" fault-current passing through the protected apparatus to an external fault, the operating-coil of said fault-responsive relaying-means being connected across said two wires, switching-means operatively associated with said two-wire conductive circuit between said operating-coil and some part of said second relaying-voltage means, said switching-means being effective, in its non-actuated position, to complete a control-circuit connection between said second relaying-voltage means and said operating-coil, said switching-means being actuatable to in effect break said control-circuit connection, and means comparatively responsive to the relative magnitudes of said first and second relaying-voltages for actuating said switching-means when the second relaying-voltage is in a predetermined manner smaller than the first relaying-voltage.

10. The invention as defined in claim 9, characterized by said switching-means including means operative at least at times to prevent an immediate return to the non-actuated position of said switching-means after a cessation of said predetermined difference in magnitude to which said switching-means has responded.

11. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means connected in series with said two wires, and means responsive, in some manner, to the amount of line-current flowing in the line-section at said second station for effecting a predetermined control over said switching-means.

12. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means connected in series with said two wires at said second station, and means responsive to the magnitude of the line-current at the second station for in effect causing said switching-means to be open at times when said second-station line-current is below a predetermined value and for in effect causing said switching-means to be closed at times when said second-station line-current is above a predetermined value.

13. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means operatively associated with said two-wire conductive circuit, and means differentially responsive, in a predetermined manner, to the currents flowing in said first circuit-means and in said two-wire conductive circuit, respectively, for effecting a predetermined control over said switching-means.

14. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means serially connected, at said first station, in said two-wire conductive circuit, and means responsive, in some manner, to a predetermined difference in the magnitudes of said first and second relaying-voltages at the first station, for effecting a predetermined control over said switching means.

15. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means operatively associated with said two-wire conductive circuit between said operating-coil and some part of said relaying-voltage means at said second station, said switching-means being effective, in its non-actuated position, to complete a control-circuit connection between said relaying-voltage means at said second station and said operating-coil at said first station, said switching-means being actuable to in effect break said control-circuit connection, and means responsive, in some manner, to a predetermined difference in the magnitudes of said first relaying-voltage at the first station and the relaying-voltage at the second station, for actuating said switching-means.

16. The invention as defined in claim 15, characterized by said switching-means including means operative at least at times to prevent an immediate return to the non-actuated position of said switching-means after a cessation of said predetermined difference in magnitude to which said switching-means has responded.

17. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, a two-wire conductive circuit joining said first and second stations for making available, at said first station, a second relaying-voltage having phases of pulsations predeterminedly responsive to the phase of the relaying-voltage at said second station, said two wires being also connected across the terminals of said operating-coil to energize the same in response to said second relaying-voltage in such polarity and amount that said two wires in effect substantially short-circuit said operating-coil in the event of a "through" fault-current passing through the line-section to an external fault, switching means operatively associated with said two-wire conductive circuit at said first station between said operating-coil and said relaying-voltage means at said second station, said switching-means being effective, in its non-actuated position, to complete a control-circuit connection between said relaying-voltage means at said second station and said operating-coil at said first station, said switching-means being actuable to in effect break said control-circuit connection, and means comparatively responsive to the relative magnitudes of said first and second relaying-voltages at said first station for actuating said switching means.

18. The invention as defined in claim 17, characterized by said switching-means including means operative at least at times to prevent an immediate return to the non-actuated position of said switching-means after a cessation of said predetermined difference in magnitude to which said switching-means has responded.

19. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means for in effect making and breaking the operative connection of said second circuit-means across the terminals of said operating-coil, and means responsive, in some manner, to the amount of current flowing in said second terminal of the protected apparatus for effecting a predetermined control over said switching-means.

20. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means for in effect making and breaking the operative connection of said second circuit-means across the terminals of said operating-coil, and means responsive to the magnitude of the current in the second terminal of the protected apparatus for in effect causing said operative connection to be broken at times when said second-terminal current is below a predetermined value and for in effect causing said operative connection to be made at times when said second-terminal current is above a predetermined value.

21. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means for in effect making and breaking the operative connection between said second relaying-voltage and said operating-coil, and means responsive, in some manner, to a predetermined difference in the magnitudes of said first and second relaying-voltages for effecting a predetermined control over said switching-means.

22. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means, said switching-means being effective, in its non-actuated position, to condition said second circuit-means in readiness to operatively function, said switching-means being operative to in effect break the operative connection between said second relaying-voltage and said operating-coil, and means responsive, in some manner, to a predetermined difference in the magnitudes of said first and second relaying-voltages for operating said switching-means.

23. The invention as defined in claim 22, characterized by said switching means including means operative at least at times to prevent an immediate return to the non-actuated position of said switching-means after a cessation of said predetermined difference in magnitude to which said switching-means has responded.

24. The combination, with an alternating-current electrical apparatus to be protected, said apparatus having a first terminal where current normally enters the apparatus and a second terminal where current normally leaves the apparatus, under predetermined power-flow conditions, of a fault-responsive relaying-means having an operating-coil, means for deriving a first relaying-voltage having phases of pulsations predeterminedly responsive to the phase of predetermined currents, at least including currents of fault-magnitude, in said first terminal, means for deriving a second relaying-voltage having phases of pulsations predeterminedly responsive to the phase of predetermined currents, at least including currents of fault-magnitude, in said second terminal, a first circuit-means connected across the terminals of said operating-coil to energize the same in response to said first relaying-voltage, a second circuit-means also connected across the terminals of said operating-coil to energize the same in response to said second relaying-voltage in such polarity and amount that said second circuit-means in effect substantially short-circuits said operating-coil in the event of a "through" fault-current passing through the protected apparatus to an external fault, switching-means operatively associated with said second circuit-means, said switching-means being effective, in its non-actuated position, to condition said second circuit-means in readiness to operatively function, said switching-means being operative to in effect break the operative connection between said second relaying-voltage and said operating-coil, and means comparatively responsive to the relative magnitudes of said first and second relaying-voltages for operating said switching-means when the second relaying-voltage is in a predetermined manner smaller than the first relaying-voltage.

25. The invention as defined in claim 24, characterized by said switching-means including means operative at least at times to prevent an immediate return to the non-actuated position of said switching-means after a cessation of said predetermined difference in magnitude to which said switching-means has responded.

26. The combination, with an alternating-current line-section having terminals at at least two different stations, and line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, communicating-channel means for making available, at said first station, a second relaying voltage having phases of pulsations predeterminedly responsive to the phase of the relaying-voltage at said second station, said communicating-channel means also including, at said first station, a second circuit-means also connected across the terminals of said operating-coil to energize the same in response to said second relaying-voltage in such polarity and amount that said second circuit-means in effect substantially short-circuits said operating-coil in the event of a "through" fault-current passing through the line-section to an external fault, switching-means operatively associated with said communicating-channel means for in effect making and breaking the operative connection of said second circuit-means across the terminals of the operating-coil at said first station, and means responsive, in some manner, to the amount of line-current flowing in the line-section at said second station for effecting a predetermined control over said switching-means.

27. The combination, with an alternating-current line-section having terminals at at least two different stations, a line-segregating circuit-interrupting means for disconnecting the line-section from other apparatus, of line-fault-responsive relaying-means for actuating said line-segregating circuit-interrupting means so as to effect a disconnecting operation, the line-fault-responsive relaying-means at a first one of said stations having an operating-coil, means for deriving a first relaying-voltage having phases of pulsations predeterminedly responsive to the phase of predetermined line-currents, at least including currents of fault-magnitude, at said first station, means for deriving a relaying-voltage having phases of pulsations predeterminedly responsive to the phase of predetermined line-currents, at least including currents of fault-magnitude, at a second one of said stations, a first circuit-means connected across the terminals of said operating-coil to energize the same in response to said first relaying-voltage, communicating-channel means for making available, at said first station, a second relaying voltage having phases of pulsations predeterminedly responsive to the phase of the relaying-voltage at said second station, said communicating-channel means also including, at said first station, a second-circuit means also connected across the terminals of said operating-coil to energize the same in response to said second relaying-voltage in such polarity and amount that said second circuit-means in effect substantially short-circuits said operating-coil in the event of a "through" fault-current passing through the line-section to an external fault, switching-means operatively associated with said communicating-channel means for in effect making and breaking the operative connection of said second circuit-means across the terminals of the operating-coil at said first station, and means responsive to the magnitude of the line-current at the second station for in effect causing said operative connection to be broken at times when said second-station line-current is below a predetermined value and for in effect causing said operative connection to be made at times when said second-station line-current is above a predetermined value.

28. The combination, with a transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; said line-fault-responsive relaying-means including means for transmitting a relaying current from said other point to the relaying point in response, in some measure, to line-current conditions at said other point at least during line-fault conditions, means at the relaying point for deriving a local relaying current in response, in some measure, to line-current conditions at said relaying point at least during line-fault conditions, a quick-acting directional relaying-means responsive both to the magnitudes and to the relative directions of the two relaying currents at the relaying point, and a differential relaying-means responsive to a predetermined difference in the magnitudes of said two relaying currents at the relaying point for changing the response-conditions of said directional relaying-means in such manner as to weaken the directional part of its operational control.

29. The combination, with a transmission-line section having terminals at at least two different stations, and line-segregating circuit interrupting means for disconnecting the line-section from other apparatus, of line-fault-responsive relaying-means at each of said stations for actuating said line-segregating circuit-interrupting means so as to effect a disconnecting operation; means, at each of said stations, for deriving a local relaying-current in response, in some measure, to line-current conditions at its station at least during line-fault conditions; means, at each of said stations, for transmitting another relaying-current to the other station at least during line-fault conditions, in response, in some measure, to its own local relaying-current, and for receiving the corresponding transmitted relaying-current from the other station; quick-acting directional relaying-means at each station for responding, in some measure, both to the magnitudes and to the relative directions of the local and received relaying-currents at its station; and differential relaying-means at at least one of said stations, responsive, in some measure, to a predetermined difference in the magnitudes of the local and received relaying-currents at its station, for controlling the transmission of relaying-current to the other station whereby the quick-acting directional relaying-means at said other station will thereafter become more sensitive in some phase of its response.

30. The combination, with a transmission-line section having terminals at at least two different stations, and line-segregating circuit-interrupting means for disconnecting the line-section from other apparatus, of line-fault-responsive relaying-means at each of said stations for actuating said line-segregating circuit-interrupting means so as to effect a disconnecting operation; means at each of said stations, for deriving a local relaying-current in response, in some measure, to line-current conditions at its station at least during line-fault conditions; means, at each of said stations, for transmitting another relaying-current to the other station at least during line-fault conditions, in response, in some measure, to its own local relaying-current, and for receiving the corresponding transmitted relaying-current from the other station; quick-acting directional relaying-means at each station, each quick-acting directional relaying-means having electro-responsive actuating-means responsive, in some measure, at least to the magnitude of the local relaying-current, each quick-acting directional relaying-means also having electro-responsive restraining-means responsive, in some measure, to the relative directions of the local and received relaying-currents at its station in the event of external line-fault conditions resulting in a "through" current-flow through the protected line-section to some external fault outside of said protected line-section; and differential relaying-means at at least one of said stations, responsive, in some measure, to a predetermined difference in the magnitudes of the local and received relaying-currents at its station, for interrupting the transmission of relaying-current to the other station.

31. The combination, with a transmission-line section having terminals at at least two different stations, and line-segregating circuit-interrupting means for disconnecting the line-section from other apparatus, of line-fault-responsive relaying-means at each of said stations for actuating said line-segregating circuit-interrupting means so as to effect a disconnecting operation; means at each of said stations, for deriving a local relaying-current in response, in some measure, to line-current conditions at its station at least during line-fault conditions; means, at each of said stations, for transmitting another relaying-current to the other station at least during line-fault conditions, in response, in some measure, to its own local relaying-current, and for receiving the corresponding transmitted relaying-current from the other station; quick-acting directional relaying-means at each station, each quick-acting directional relaying-means having electro-responsive actuating-means responsive, in some measure, at least to the magnitude of the local relaying-current, each quick-acting directional relaying-means also having electro-responsive restraining-means responsive, in some measure, to the relative directions of the local and received relaying-currents at its station in the event of external line-fault conditions resulting in a "through" current-flow through the protected line-section to some external fault outside of said protected line-section; and differential relaying-means at at least one of said stations, responsive, in some measure, to a predetermined difference in the magnitudes of the local and received relaying-currents at its station, for interrupting the receipt of relaying-current from said other station.

32. The invention as defined in claim 28, characterized by said differential relaying-means including time-delay means for in effect causing said differential relaying-means to temporarily retain its response after a cessation of said predetermined difference in magnitude to which said differential relaying-means has responded.

33. The invention as defined in claim 29, characterized by said differential relaying-means including time-delay means for in effect causing said differential relaying-means to temporarily retain its response after a cessation of said predetermined difference in magnitude to which said differential relaying-means has responded.

34. The invention as defined in claim 30, characterized by said differential relaying-means including time-delay means for in effect causing said differential relaying-means to temporarily retain its response after a cessation of said predetermined difference in magnitude to which said differential relaying-means has responded.

35. The invention as defined in claim 31, characterized by said differential relaying-means including time-delay means for in effect causing said differential relaying-means to temporarily retain its response after a cessation of said predetermined difference in magnitude to which said differential relaying-means has responded.

ROY M. SMITH.
MYRON A. BOSTWICK.